United States Patent
Knaappila

(10) Patent No.: US 11,252,661 B2
(45) Date of Patent: Feb. 15, 2022

(54) PACKET SYNCHRONIZATION INFORMATION PEEKING

(71) Applicant: Silicon Laboratories Inc., Austin, TX (US)

(72) Inventor: Jere M. Knaappila, Evitskog (FI)

(73) Assignee: Silicon Laboratories Inc., Austin, TX (US)

( * ) Notice: Subject to any disclaimer, the term of this patent is extended or adjusted under 35 U.S.C. 154(b) by 83 days.

(21) Appl. No.: 16/928,356

(22) Filed: Jul. 14, 2020

(65) Prior Publication Data
US 2022/0022132 A1    Jan. 20, 2022

(51) Int. Cl.
*H04W 52/02* (2009.01)
*H04W 56/00* (2009.01)

(52) U.S. Cl.
CPC ..... *H04W 52/0216* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 7,564,832 B2* | 7/2009 | Van Parys | H04W 74/04 370/350 |
| 7,693,485 B2* | 4/2010 | Van Parys | H04W 74/04 455/41.2 |

* cited by examiner

*Primary Examiner* — Ayanah S George
(74) *Attorney, Agent, or Firm* — Nields, Lemack & Frame, LLC

(57) ABSTRACT

A device, method and software program that allows a network device to remain synchronized to a master device while minimizing its own power consumption is disclosed. The network device exits a low power mode at regular intervals in order to receive a synchronous communication from a master device. Once the network device has received enough information to confirm that this synchronous communication is from the correct master device, the network device may then return to the low power mode, even before the entirety of the synchronous communication has been received. This may reduce the time that the network device is in the active state by more than 90% in certain instances.

20 Claims, 6 Drawing Sheets

PACKET SYNCHRONIZATION INFORMATION PEEKING

FIELD

This disclosure describes systems and methods for optimization of the power consumption of a wireless network device, and more particularly, a Bluetooth network device.

BACKGROUND

Bluetooth is one of many wireless network protocols that are currently in use. Bluetooth is commonly used to connect smartphones to watches, headphones, speakers, and other accessories. Bluetooth low energy utilizes 40 physical channels in the 2.4 GHz ISM band, each channel separated by 2 MHz.

Additionally, Bluetooth has added direction finding capability to the protocol, allowing properly configured devices to determine the angle of arrival or angle of departure to a specific beacon.

Further, Bluetooth also supports several types of synchronous unidirectional communications. For example, the Bluetooth specification describes a feature known as periodic advertising. In this mode, a master device transmits an advertisement at regular intervals on a predetermined channel. The transmission of this advertisement occurs at regular intervals. These regular intervals may be multiples of 1.25 milliseconds, between 7.5 milliseconds and 81.91875 seconds. In this way, a network device is able to enter a low power state and can wake up at predetermined times in order to receive the next advertisement. Because of clock inaccuracies in both the master device and the network device, the network device must typically awaken for each advertisement in order to maintain synchronization.

In certain embodiments, the periodic advertisement may be used to provide directional information. For example, in Bluetooth, these periodic advertisements may also include a constant tone extension (CTE). The CTE includes a guard period, a reference period, and a plurality of switch slots and sample slots. The duration of each switch slot and sample slot may be 1 μsec or 2 μsec. The CTE is a special extension to the Bluetooth packet that transmits a constant frequency, such as a 250 kHz tone. For example, the CTE may be a string of consecutive "1"'s. In practice, a network device uses a single antenna element of its antenna array to receive the CTE during the guard period and the reference period. The network device may then switch to another antenna element during the switch slots by changing the selection of the analog multiplexer in the radio circuit. The network device samples the tone again with that new antenna element during the sample slot. The network device continues switching the antenna element during each switch slot and sampling the tone during the sample slot. By determining a different in phase between the signals received by the various antenna elements, the network device can determine the angle of arrival. The CTE may be as long as 160 μsec and as short as 16 μsec.

Bluetooth also supports a feature known as isochronous broadcasting. In this mode, the master device transmits events at regular intervals, which may be between 5 milliseconds and 4 seconds, in multiples of 1.25 milliseconds. Each of these events may be divided into one or more subevents. These subevents are typically audio streams. For example, each event may be divided into two subevents, wherein one subevent is an audio stream for a left speaker and the second subevent is an audio stream for a right speaker. The audio stream may be compressed so that there are pauses between consecutive events.

Thus, even though the network device may enter a low power mode for extended periods of time between synchronous communications, the network device may be awake for an extended period of time if the synchronous communication includes a large amount of data, such as a CTE or an audio stream.

Therefore, it would be advantageous if there was a device, method and software program that could allow the network device to remain synchronized to the master device while minimizing its own power consumption.

SUMMARY

A device, method and software program that allows a network device to remain synchronized to a master device while minimizing its own power consumption is disclosed. The network device exits a low power mode at regular intervals in order to receive a synchronous communication from a master device. Once the network device has received enough information to confirm that this synchronous communication is from the correct master device, the network device may then return to the low power mode, even before the entirety of the synchronous communication has been received. This may reduce the time that the network device is in the active state by more than 90% in certain instances.

According to one embodiment, a method of reducing power consumption in a network device, the network device comprising a wireless network interface to received synchronous communications from a master device, is disclosed. The method comprises enabling the wireless network interface in the network device before the expected transmission of a first synchronous communication; transmitting the first synchronous communication from the master device, wherein synchronous communications are transmitted by the master device at regular intervals; receiving, at the network device, a portion of the first synchronous communication; disabling the wireless network interface before an entirety of the first synchronous communication is received; and determining a time to enable the wireless network interface to receive a subsequent synchronous communication based on a time that the network device began receiving the first synchronous communication. In certain embodiments, the first synchronous communication is a synchronized periodic advertisement comprising a preamble, an access-address, a protocol data unit, and a cyclic redundancy code. In some embodiments, the network device disables the network interface following the access-address. In some embodiments, the protocol data unit comprises an extended header, the extended header comprising an Extended Header Flags field, an AdvA field, a TargetA field, a AdvData Info field, an AuxPtr field, a SyncInfo field, a TxPower field and an Additional Controller Advertising Data (ACAD) field, and the network device disables the wireless network interface following reception of one of the fields. In some embodiments, the synchronized periodic advertisement comprises a constant tone extension (CTE) and the network device disables the wireless network interface before receiving an entirety of the CTE. In some embodiments, the network device disables the wireless network interface before receiving the entirety of the CTE if the network device is not moving. In certain embodiments, the synchronized periodic advertisement comprises one or more auxiliary packets and the network device disables the wireless network interface prior to receiving an entirety of the one or more auxiliary packets.

According to another embodiment, a network device is disclosed. The network device comprises a wireless network interface; a processing unit; and a memory device in communication with the processing unit, comprising instructions, which when executed by the processing unit, enable the network device to: enable the wireless network interface before the expected transmission of a first synchronous communication; receive a portion of the first synchronous communication; disable the wireless network interface before an entirety of the first synchronous communication is received; and determine a time to enable the wireless network interface to receive a subsequent synchronous communication based on a time that the network device began receiving the first synchronous communication. In certain embodiments, the first synchronous communication is a synchronized periodic advertisement comprising a preamble, an access-address, a protocol data unit, and a cyclic redundancy code. In certain embodiments, the network device disables the network interface following the access-address. In some embodiments, the protocol data unit comprises an extended header, the extended header comprising an Extended Header Flags field, an AdvA field, a TargetA field, a AdvData Info field, an AuxPtr field, a SyncInfo field, a TxPower field and an Additional Controller Advertising Data (ACAD) field, and the network device disables the wireless network interface following reception of one of the fields. In certain embodiments, the synchronized periodic advertisement comprises a constant tone extension (CTE) and the network device disables the wireless network interface before receiving an entirety of the CTE. In certain embodiments, the network device comprises an accelerometer, and the network device disables the wireless network interface before receiving the entirety of the CTE if the accelerometer indicates that the network device is not moving. In certain embodiments, the synchronized periodic advertisement comprises one or more auxiliary packets and the network device disables the wireless network interface prior to receiving an entirety of the one or more auxiliary packets.

According to another embodiment, a software program is disclosed. The software program is disposed on a non-transitory computer readable medium, and comprises instructions, which when executed by a network device having a wireless network interface and a processing unit, enable the network device to: enable the wireless network interface before the expected transmission of a first synchronous communication; receive a portion of the first synchronous communication; disable the wireless network interface before an entirety of the first synchronous communication is received; and determine a time to enable the wireless network interface to receive a subsequent synchronous communication based on a time that the network device began receiving the first synchronous communication. In certain embodiments, the first synchronous communication is a synchronized periodic advertisement comprising a preamble, an access-address, a protocol data unit, and a cyclic redundancy code. In some embodiments, the instructions enable the network device to disable the network interface following the access-address. In some embodiments, the protocol data unit comprises an extended header, the extended header comprising an Extended Header Flags field, an AdvA field, a TargetA field, a AdvData Info field, an AuxPtr field, a SyncInfo field, a TxPower field and an Additional Controller Advertising Data (ACAD) field, and the instructions enable the network device to disable the wireless network interface following reception of one of the fields. In certain embodiments, the synchronized periodic advertisement comprises a constant tone extension (CTE) and the instructions enable the network device to disable the wireless network interface before receiving an entirety of the CTE. In some embodiments, the instructions enable the network device to disable the wireless network interface before receiving the entirety of the CTE if the network device is not moving.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
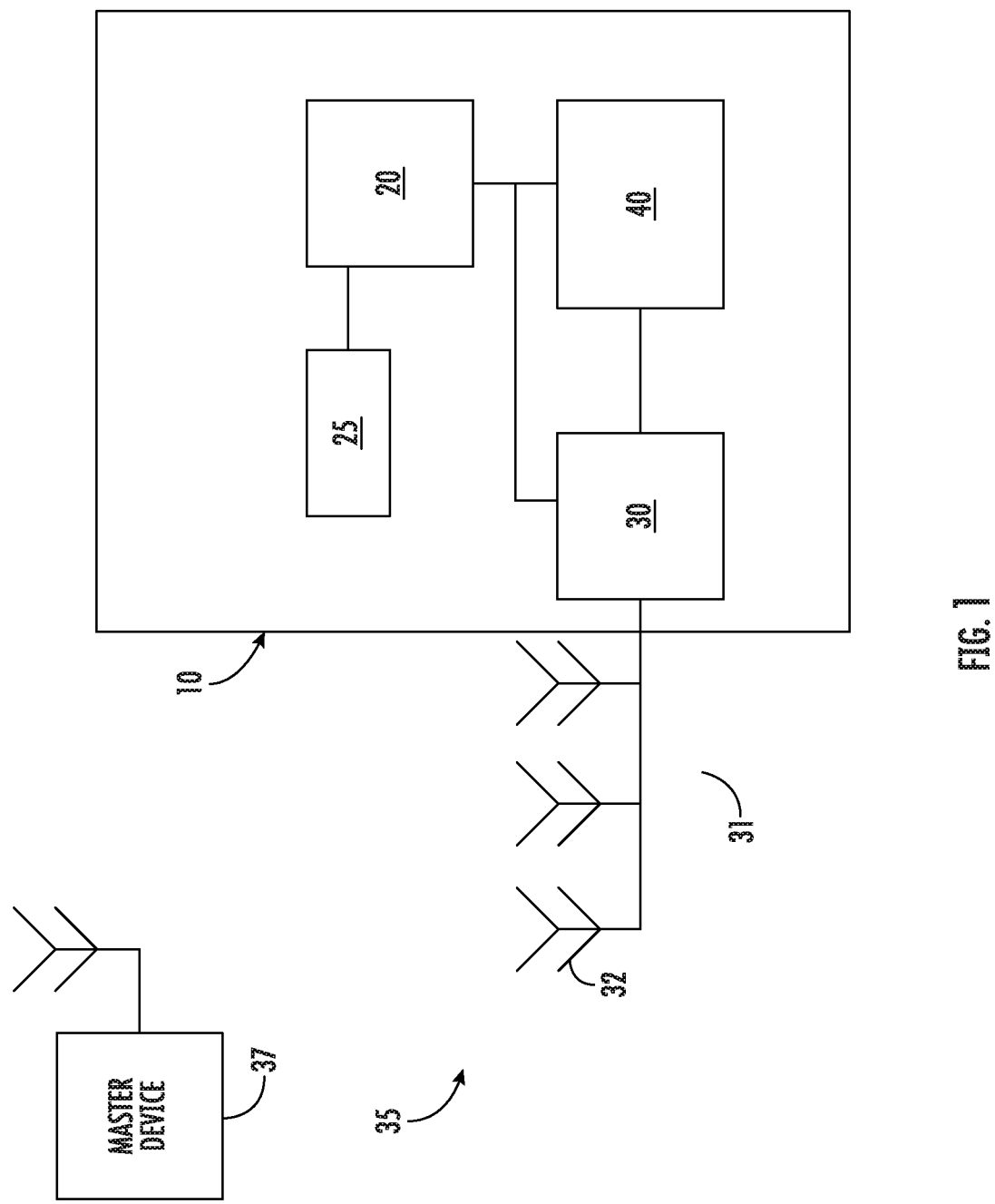
FIG. 1 is a block diagram of a representative device that may be utilized according to one embodiment.

The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory computer readable storage media.

The network device 10 also includes a network interface 30, which may be a wireless network interface that includes an antenna array 31. The antenna array 31 may comprise a plurality of antenna elements 32. In certain embodiments, the network interface 30 may support any wireless network protocol that supports AoX determination, such as Bluetooth. The network interface 30 is used to allow the network device 10 to communicate with other devices disposed on the network 35, such as master device 37. In other embodiments, the network device 10 may not include an antenna array and may have only one antenna element 32.

The network interface 30 is used to process the incoming signal and convert the wireless signals to digital signals.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable non-transitory storage medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

In certain embodiments, the antenna array 31 comprises a plurality of antenna elements 32, which are arranged in a fixed, known pattern. For example, in one embodiment, the antenna array 31 may comprises a plurality of antenna elements 32 arranged in a linear fashion. In one embodiment, the same spacing is established between any two adjacent antenna elements 32. In another embodiment, the antenna elements 32 may be arranged as a two-dimensional array or a three-dimensional array. In one further embodiment, the spacing between any two adjacent antenna elements in one direction is the same. In certain embodiments, the spacing between antenna elements 32 is related to the transmitted and received wavelengths. For example, the spacing between adjacent antenna elements 32 may be a half wavelength or less. The number of antenna elements 32 in the antenna array 31 is not limited by this disclosure. Further, the type of antenna array is not limited, and may be, for example, a uniform linear array (ULA), a uniform rectangular array (URA), a uniform circular array (UCA) or any other type. As stated above, in other embodiments, the network device 10 does not include an antenna array 31 and only has a single antenna element 32.

The wireless signals first enter the network interface 30 through an antenna element 32. The antenna element 32 is in electrical communication with a low noise amplifier (LNA). In certain embodiments, an analog switch may be used to select one of the antenna elements 32 to communicate with the LNA. In other embodiments, there is no analog switch if there is only one antenna element 32. The LNA receives a very weak signal from one antenna element 32 and amplifies that signal while maintaining the signal-to-noise ratio (SNR) of the incoming signal. The amplified signal is then passed to a mixer. The mixer is also in communication with a local oscillator, which provides two phases to the mixer. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer are then fed into programmable gain amplifier (PGA). The PGA amplifies the $I_m$ and $Q_m$ signals by a programmable amount. These amplified signals may be referred to as $I_g$ and $Q_g$. The amplified signals, $I_g$ and $Q_g$, are then fed from the PGA into an analog to digital converter (ADC). The ADC converts these analog signals to digital signals, $I_d$ and $Q_d$. These digital signals may then pass through a channel filter. The filtered signals are referred to as I and Q. These I and Q signals can be used to recreate the amplitude and phase of the original signal. In certain embodiments, an analog switch may then be switched so as to select a different one of the antenna elements 32 so that the above process may be repeated for each antenna element 32. In certain embodiments, rather than utilizing an analog switch, the network interface may comprise a plurality of LNAs, mixers, PGAs and ADCs, so that the signals from all of the antenna elements 32 can be processed simultaneously.

The network interface 30 may support any wireless network that supports synchronous communications, such as Bluetooth, and other networks such as Wi-Fi, networks utilizing the IEEE 802.15.4 specification, such as Zigbee, networks utilizing the IEEE 802.15.6 specification, and wireless smart home protocols, such as Z-Wave. The network interface 30 is used to allow the network device to communicate with other devices disposed on the network 35, such as master device 37.

Figure 2:
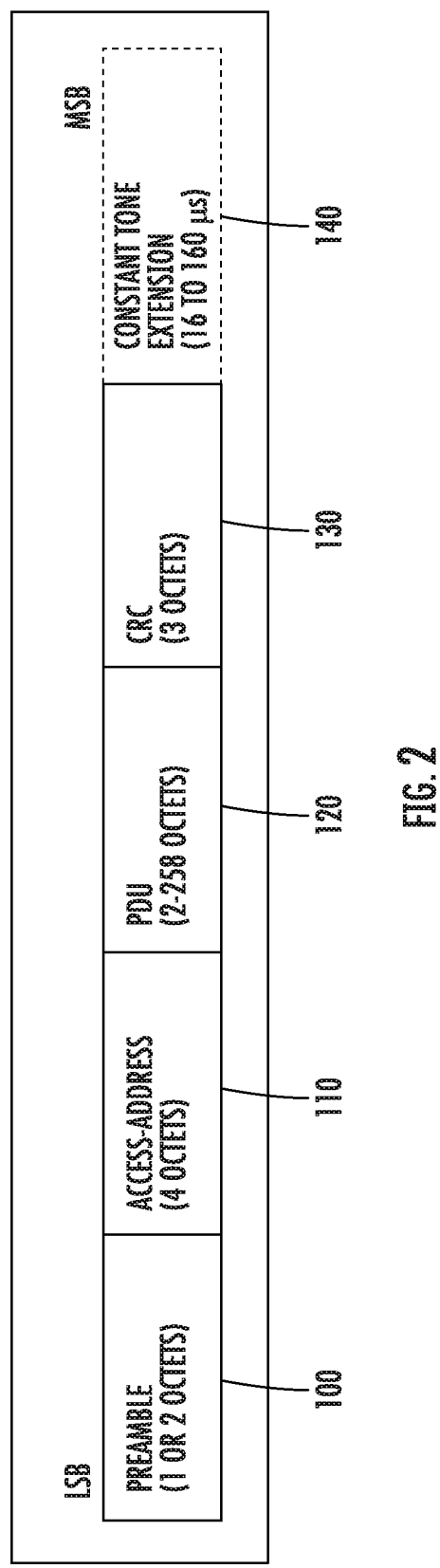
FIG. 2 shows the format of a Bluetooth packet.

FIG. 2 shows a typical Bluetooth packet. The packet includes a preamble 100, an access-address 110, a protocol data unit (PDU) field 120, a cyclic redundancy code (CRC) 130, and optionally a constant tone extension (CTE) 140. The preamble 100 may have a length of one or two octets, while the access-address 110 may have a length of 4 octets. The PDU field 120 has a variable length, depending on the PDU type and may have a length of between 2 and 258 octets. The CRC 130 has a length of three octets. When included, the CTE 140 may have a length between 16 and 160 µseconds.

As stated above, Bluetooth support several types of synchronous communications, including periodic advertisements and isochronous broadcasting.

Figure 3:
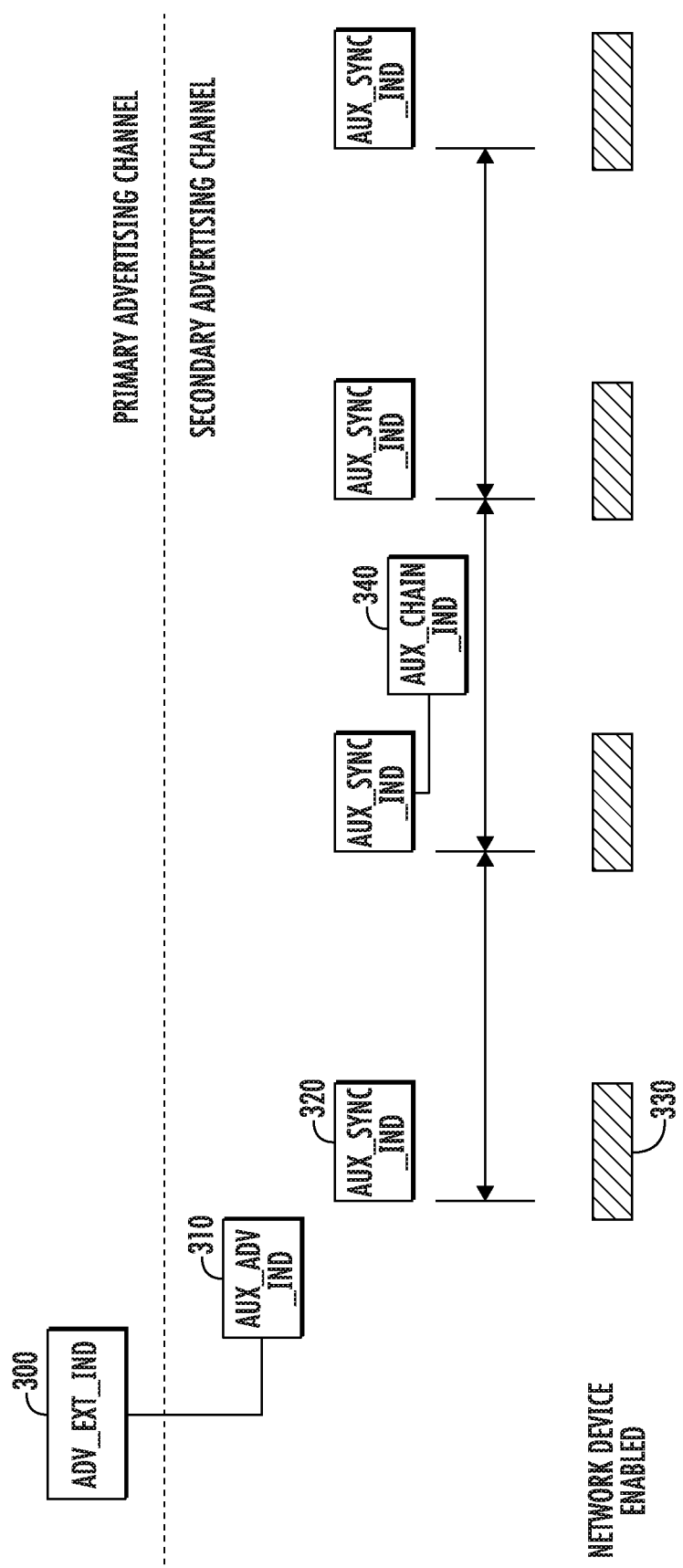
FIG. 3 shows a time line illustrating Bluetooth periodic advertising.

FIG. 3 shows a timing diagram showing the periodic advertisement operation used by the Bluetooth protocol. In Bluetooth, three channels are designated as primary advertising channels. The master device 37 begins by first transmitting an advertising event 300. This advertising event may be the transmission of a packet on one or more of the primary advertising channels. This packet may be an ADV_EXT_IND PDU packet. The ADV_EXT_IND PDU packet informs the network devices of the channel map, the offset of a subsequent packet (known as the AUX_ADV_IND packet) and which PHY is being used. This packet also contains an access-address that will be used in the periodic advertisements. The master device 37 then transmits the AUX_ADV_IND PDU packet 310 on the secondary channel referenced in the ADV_EXT_IND PDU packet. This packet informs the network device of the offset to the next packet (known as the AUX_SYNC_IND), the fixed interval that will be used between successive advertisements, and the channel map. The master device 37 then transmits synchronized periodic advertisements 320, known as AUX_SYNC_IND PDU packets, on the secondary channel. Furthermore, the master device 37 continues to transmit the synchronized periodic advertisements 320 on the secondary channel at regular intervals (which is defined in the AUX_ADV_IND PDU packet). Each synchronized periodic advertisement 320, or AUX_SYNC_IND PDU packet, will also utilize the same access address that was first defined in the ADV_EXT_INT PDU packet.

As shown at the bottom of the time line, the network device 10 enables its network interface 30 in advance of each synchronized periodic advertisements 320. The period of time that the network interface 30 is enabled is shown as receiving window 330. Note that the receiving window 330 begins prior to the transmission of the synchronized periodic advertisement 320. This is done to compensate for possible clock inaccuracies. For example, the clock associated with the master device 37 may have an accuracy of 20 ppm, while the clock associated with the network device 10 may have an accuracy of 100 ppm. If the advertisement interval between synchronized periodic advertisements is 10 milliseconds, the master device 37 may transmit the next advertisement at a time that may up to 200 nanoseconds less than or greater than 10 milliseconds. Similarly, the network device 10 may enable its network interface 30 up to at a time that may be up to 1 µseconds less than or greater than 10 milliseconds. Thus, if the clock of the master device 37 runs slightly faster than nominal while the clock of the network device 10 runs slightly slower than nominal, the network device 10 may miss the synchronized periodic advertisement. Thus, to avoid this, the network device 10 may intentionally open its receiving window earlier than the expected advertisement. For example, the network device 10 may open its receiving window 330 before the expected arrival of the synchronized periodic advertisement 320. The amount of time prior to the expected arrival may be defined as the window widening interval and may be equal to (master clock accuracy+ network device clock accuracy)*advertisement interval.

Once the network device 10 receives the synchronized periodic advertisement 320, it then determines the time at which it should enable its receiving window 330 for the next synchronized periodic advertisement 320. This time may be defined as the beginning of the just received synchronized periodic advertisement, also referred to as the anchor point, plus the advertisement interval, minus the window widening interval.

Note that, from FIG. 2, the total length of a synchronized periodic advertisement, assuming a data rate of 1 Mb/sec, is between 80 µsec and 2288 µsec, where the preamble is 1 octet. Therefore, the total time that the network interface 30 is enabled may be equal to the window widening interval, plus the advertisement duration.

However, in certain embodiments, the network device 10 may be in a high latency mode, where it does not require any data from the master device 37. Rather, the network device 10 enables its network interface 30 simply to remain synchronized to the advertisements.

In one embodiment, the amount of time that the network interface 30 is enabled may be significantly reduced by disabling the network interface 30 after only a portion of the synchronized periodic advertisement 320 is received. The portions of the synchronized periodic advertisement that is received before the network device disables the network interface can be varied.

As stated above, the network device 10 may only enable its network interface 30 so that it can determine the anchor point, which enables the network device 10 to calculate the next time where it should enable its network interface 30.

Figure 4:
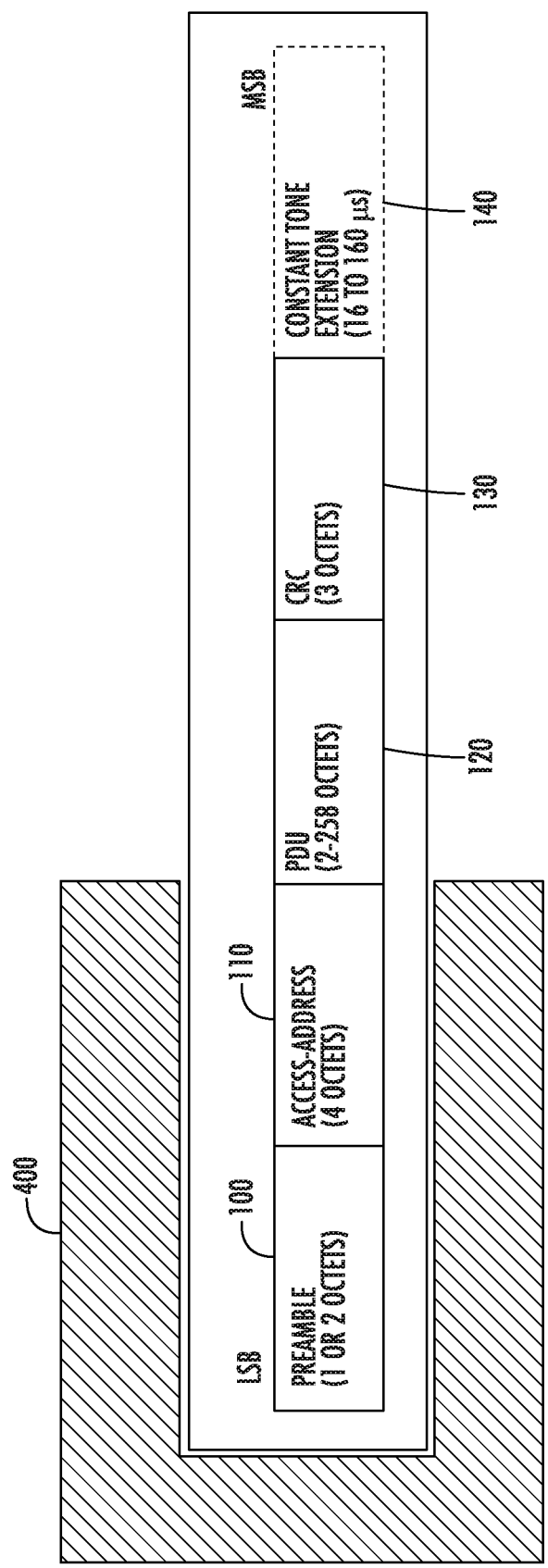
FIG. 4 shows a Bluetooth packet with the receiving window overlaid on the packet.

Thus, in one embodiment, shown in FIG. 4, the network device 10 receives the preamble 100 and the access-address 110, determines that this is the expected synchronized periodic advertisement 320, disables the network interface 30 by disabling the receiving window 400 and calculates the next time that it should enable the network interface 30 based on the anchor point of this synchronized periodic advertisement 320.

In another embodiment, the network device 10 may continue to receive the synchronized periodic advertisement 320 for a longer duration before disabling the network interface 30. This longer duration may allow other fields within the synchronized periodic advertisement 320 to be received.

Figure 5:
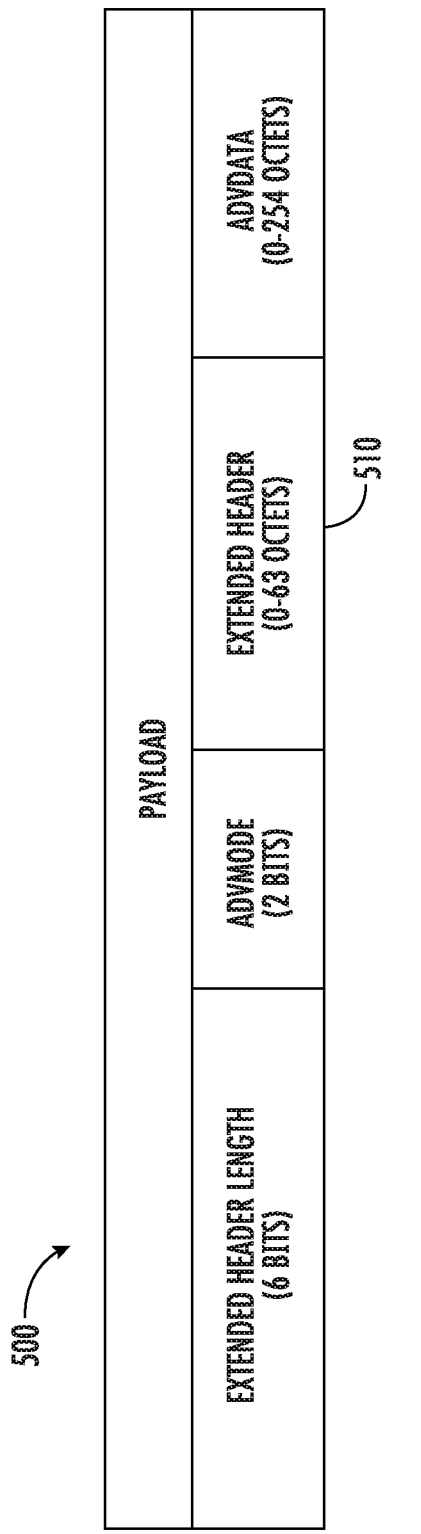
FIG. 5 shows the typical payload for an advertisement.

For example, in certain embodiments, the synchronized periodic advertisement 320 may include a PDU field that includes an extended header 510. FIG. 5 shows a typical payload 500 for an advertisement.

Figure 6:
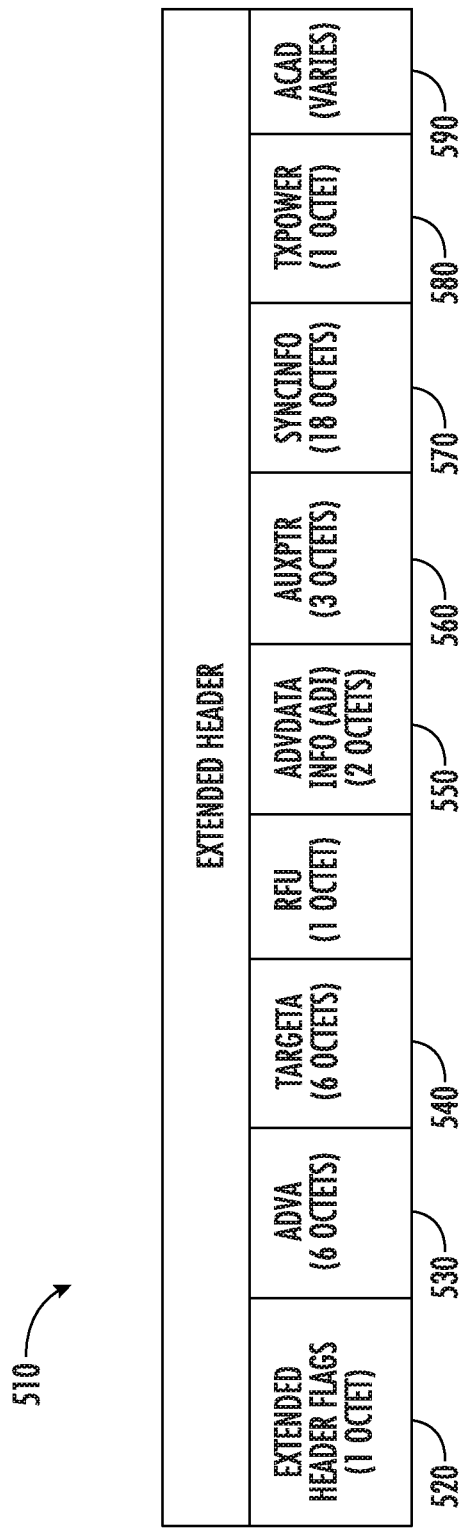
FIG. 6 shows the format of the Extended Header in the advertisement.

The extended header 510 may contain a plurality of fields, such as those shown in FIG. 6.

The Extended Header Flags field 520 includes a plurality of bits, where each bit is used to denote whether the corresponding field is included in the extended header 510. For example, there is a bit that corresponds to each of the following fields: AdvA field 530, TargetA field 540, AdvData Info field 550, AuxPtr field 560, SyncInfo field 570, and TxPower field 580.

The AdvA field 530, when present, contains the advertiser's device address.

The TargetA field 540, when present, contains the address of the target toward which the advertisement is directed.

The AdvData Info field 550, also referred to as ADI, is used to distinguish between different advertising sets. One bit field within the AdvData Info field 550 is used to indicate that the data can be considered to be duplicative.

The AuxPtr field 560 indicates that the advertisement is continued in a subsequent auxiliary packet. The AuxPtr field 560 provides the channel, offset and PHY mode used in the auxiliary packet. An example auxiliary packet 340 is shown in FIG. 3.

The SyncInfo field 570 is used by an AUX_ADV_IND PDU packet 310 to define the parameters associated with the synchronized periodic advertisement 320.

The TxPower field 580 is used to define the power level used by the master device 37.

The Additional Controller Advertising Data (ACAD) field 590 is used to communicate metadata, vendor specific information or other descriptive information.

In certain embodiments, the network device 10 may enable the network interface 30 to allow at least a portion of the extended header 510 to be received. For example, the network device 10 may wish to receive the entire synchronized periodic advertisement 320 if the data is new. Thus, the network device 10 may wait until the Extended Header Flags field 520 is received. If the bit corresponding to the AdvData Info field 550 is not set, then the network device 10 knows that new data is not being transmitted. Thus, in some embodiments, the network device 10 may disable the network interface 30 following receipt of the Extended Header Flags field 520, depending on the contents of that field.

In another embodiment, the Extended Header Flags field 520 may indicate that a particular field, such as the AdvData Info field 550 or the AuxPtr field 560 is present. Of course, the network device 10 may be interested in any of the other fields in the Extended Header 510 including the ACAD field 590. In these embodiments, the network device 10 may continue to enable the network interface 30 so that the fields of interest can be received. Based on the data in those fields, the network device 10 may then choose to disable the network interface 30. Thus, in certain embodiments, the network device 10 disables the network interface 30 after reception of a particular field in the Extended Header 510.

Thus, in this embodiment, the network device 10 disables the network interface 30 after receipt of a particular field in the Extended Header 510.

As noted above, in certain instances, the periodic advertisement may not be transmitted within a single packet. In these embodiments, the remainder of the periodic advertisement is transmitted using auxiliary packets 340, as shown in FIG. 3. Information regarding the auxiliary packet may be found in the AuxPtr field 560. For example, the master device 37 may utilize auxiliary packets to transmit the CTE 140 over different channels, thereby increasing its accuracy. Of course, the master device 37 may use auxiliary packets for other reasons. According to the Bluetooth specification, the network device 10 is supposed to receive the entirety of the advertisement, including any auxiliary packets.

However, the network device 10 may determine that it does not need all of the information contained in the auxiliary packet 340 or packets. Thus, according to another embodiment, the network device 10 may disable its network interface 30 and not receive the auxiliary packet 340, or only receive a portion of the auxiliary packet 340. Thus, in this embodiment, the advertisement includes one or more auxiliary packets and the network device 10 disables its network interface 30 before the reception of all of the auxiliary packets.

In yet another embodiment, the network device 10 may skip one or more of the synchronized periodic advertisements 320 and increase its widening window interval accordingly. For example, if the advertisement interval is 10 milliseconds, the network device 10 may enable its network interface every N*10 milliseconds, where N is an integer greater than 1. Note that the network device 10 may also increase its widening window interval by a factor of N to maximize the possibility of receiving the synchronized periodic advertisement 320.

Further, the above description discloses that the network device 10 disables its network interface 30 at certain points during the transmission of an advertisement. However, in certain embodiments, the network device 10 may enter a low power state after receiving a portion of the periodic advertisement. Thus, in certain embodiments, in addition to disabling the network interface 30, the network device 10 enters a low power state. The low power state may include turning off power to certain portions of the device.

The present system has many advantages. For example, consider a pallet disclosed in a warehouse, where the pallet includes a network device to monitor its location within the warehouse. Assume that the network device on the pallet is also in communication with an accelerometer. As described above, the network device may enable its network interface at regular intervals to receive the synchronized periodic advertisement. The network device may also query the accelerometer to determine if the pallet is moving. If the pallet is not moving, the network device may not need to receive the CTE as it already knows its position. Thus, if the accelerometer indicates that the pallet is not moving, the network device may disable its network interface immediately after receiving the access-address (or some other field) just to ensure that it remains synchronized with the master device. In other words, the network device may disable its network interface before receiving the entirety of the CTE. In other embodiments, the network device may disable its network interface before receiving any of the CTE. However, if the accelerometer indicates that the pallet is in motion, the network device may receive the entirety of the synchronized periodic advertisement so that it can receive the CTE. The network device may then use the CTE to determine its position. The network device may continue to receive the synchronized periodic advertisements as long as the pallet is in motion. Once the pallet becomes stationary, the network device may then again disable the network interface immediately after receiving the access-address (or some other field) just to ensure that it remains synchronized with the master device.

This technique may be used to greatly reduce power consumption. In certain embodiments, a complete advertisement may be as long as 2288 µseconds. If the network device disables the network interface immediately after the access-address, the network interface only is active for about 40 µseconds. In other embodiments, an advertisement using a coded PHY may be as long as 17104 µseconds. In this embodiment, if the network device disables the network interface immediately after the access-address, the network interface only is active for about 336 µseconds. Thus, in both embodiments, the power consumed by the network interface may be reduced by as much as 98%.

As noted above, Bluetooth also supports isochronous broadcasting. An isochronous broadcast is transmitted by a master device in a packet having the format shown in FIG. 2. The PDU field 120 includes a header that indicates that the packet is an isochronous broadcast and a payload. The payload may contain audio data. One or more network devices may belong to a Broadcast Isochronous Group, or BIG.

Figure 7:
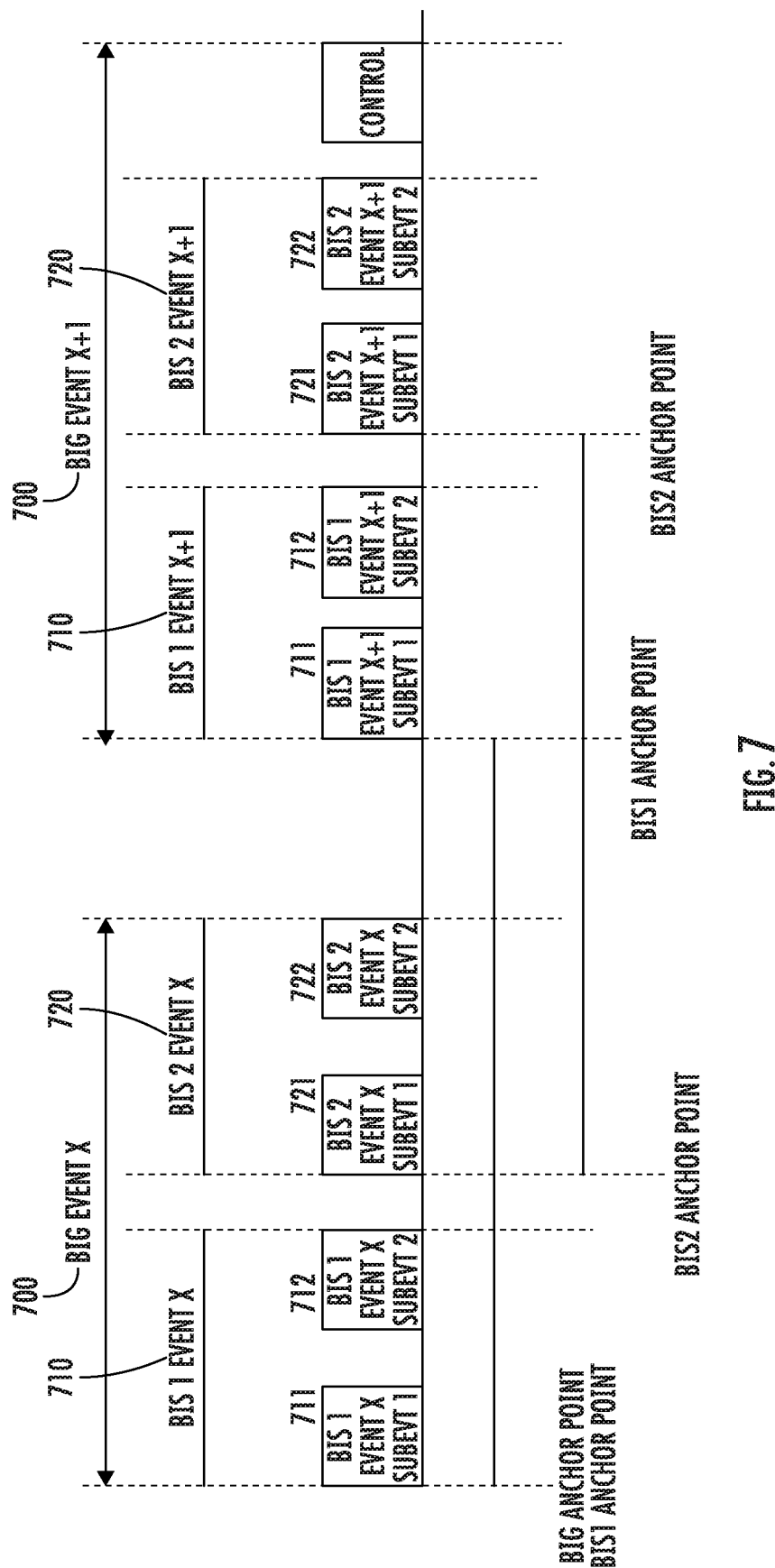
FIG. 7 shows a time line illustrating Bluetooth Isochronous Broadcasting.

FIG. 7 shows a timing diagram that is representative of isochronous broadcasting according to the Bluetooth specification. Isochronous broadcasts are arranged as Broadcast Isochronous Group (BIG) events 700 where a BIG event may include a plurality of Broadcast Isochronous Streams (BIS) events and subevents. For example, in FIG. 7, each BIG event includes two BIS events; BIS1 event 710 and BIS2 event 720. In certain embodiments, the BIS1 event 710 may include audio data intended for a left speaker, while the BIS2 event 720 may include audio data intended for a right speaker. Further, each BIS event may be divided into subevents. For example, the BIS1 event 710 may be divided into BIS1 subevent1 711 and BIS1 subevent2 712. This may be done due to the length constraints associated with a Bluetooth packet. Thus, to transmit the required amount of audio data, multiple subevents may be needed.

Furthermore, the BIG events 700 are transmitted at regular intervals. FIG. 7 shows various anchor points. In other words, the time from the start of one BIG event 700 to the start of the next BIG event is constant. Similarly, the time from the start of a BIS1 subevent1 711 to the start of the next BIS1 subevent1 is also constant. Also, the time from the start of a BIS2 subevent1 721 to the start of the next BIS2 subevent1 721 is also constant. Thus, to remain synchronized, the network device may enable its network interface at the start of each BIG event 700 (or at the start of every BIS2 subevent1 721. However, in certain embodiments, the network device may not require the audio data. For example, if the speaker is in mute mode, there is no need to receive the audio data. Thus, the network device may disable the network interface after the receipt of the access-address or the header of the PDU. In another embodiment, the network device may be typically asleep but require fast reconnect time, such as an intercom or a Walkie-Talkie.

These are two examples of synchronous communications that are supported by Bluetooth. Other network protocols may also support synchronous communications. Thus, the application is not limited to Bluetooth. Rather, the disclosure is applicable to any network protocol that utilizes synchronous communications.

Thus, in these embodiments, the present application describes a network device, a method and a software program that enables the network device to remain synchronized to a master device that is transmitting synchronous transmissions, while minimizing power consumption. In certain embodiments, the network device enables its network interface prior to the expected transmission of the synchronous transmission. Once the network device receives a portion of the synchronous transmission, it may then determine that it is indeed the expected synchronous communication. The network device may then disable its network device before receiving an entirety of the synchronous communication. The network device then determines the time at which the network interface should be enabled again based on the time that the network device began receiving the synchronous transmission.

According to another embodiment, the master device may transmit less than the entire synchronized periodic advertisement. For example, the master device may simply transmit the preamble and the access-address and then terminate the transmission.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of reducing power consumption in a network device, the network device comprising a wireless network interface to receive synchronous communications from a master device, the method comprising:
    enabling the wireless network interface in the network device before an expected transmission of a first synchronous communication;
    transmitting the first synchronous communication from the master device, wherein synchronous communications are transmitted by the master device at regular intervals;
    receiving, at the network device, a portion of the first synchronous communication;
    disabling the wireless network interface before an entirety of the first synchronous communication is received; and
    determining a time to enable the wireless network interface to receive a subsequent synchronous communication based on a time that the network device began receiving the first synchronous communication.

2. The method of claim 1, wherein the first synchronous communication is a synchronized periodic advertisement comprising a preamble, an access-address, a protocol data unit, and a cyclic redundancy code.

3. The method of claim 2, wherein the network device disables the network interface following the access-address.

4. The method of claim 2, wherein the protocol data unit comprises an extended header, the extended header comprising an Extended Header Flags field, an AdvA field, a TargetA field, a AdvData Info field, an AuxPtr field, a SyncInfo field, a TxPower field and an Additional Controller Advertising Data (ACAD) field, and wherein the network device disables the wireless network interface following reception of one of the fields.

5. The method of claim 2, wherein the synchronized periodic advertisement comprises a constant tone extension (CTE) and wherein the network device disables the wireless network interface before receiving an entirety of the CTE.

6. The method of claim 5, wherein the network device disables the wireless network interface before receiving the entirety of the CTE if the network device is not moving.

7. The method of claim 2, wherein the synchronized periodic advertisement comprises one or more auxiliary packets and the network device disables the wireless network interface prior to receiving an entirety of the one or more auxiliary packets.

8. A network device, comprising:
    a wireless network interface;
    a processing unit; and
    a memory device in communication with the processing unit, comprising instructions, which when executed by the processing unit, enable the network device to:
        enable the wireless network interface before an expected transmission of a first synchronous communication;
        receive a portion of the first synchronous communication;
        disable the wireless network interface before an entirety of the first synchronous communication is received; and
        determine a time to enable the wireless network interface to receive a subsequent synchronous communication based on a time that the network device began receiving the first synchronous communication.

9. The network device of claim 8, wherein the first synchronous communication is a synchronized periodic advertisement comprising a preamble, an access-address, a protocol data unit, and a cyclic redundancy code.

10. The network device of claim 9, wherein the network device disables the network interface following the access-address.

11. The network device of claim 9, wherein the protocol data unit comprises an extended header, the extended header comprising an Extended Header Flags field, an AdvA field, a TargetA field, a AdvData Info field, an AuxPtr field, a SyncInfo field, a TxPower field and an Additional Controller Advertising Data (ACAD) field, and wherein the network device disables the wireless network interface following reception of one of the fields.

12. The network device of claim 9, wherein the synchronized periodic advertisement comprises a constant tone extension (CTE) and wherein the network device disables the wireless network interface before receiving an entirety of the CTE.

13. The network device of claim 12, wherein the network device comprises an accelerometer, and wherein the network device disables the wireless network interface before receiving the entirety of the CTE if the accelerometer indicates that the network device is not moving.

14. The network device of claim 9, wherein the synchronized periodic advertisement comprises one or more auxiliary packets and the network device disables the wireless network interface prior to receiving an entirety of the one or more auxiliary packets.

15. A software program disposed on a non-transitory computer readable medium, comprising instructions, which when executed by a network device having a wireless network interface and a processing unit, enable the network device to:
enable the wireless network interface before an expected transmission of a first synchronous communication;
receive a portion of the first synchronous communication;
disable the wireless network interface before an entirety of the first synchronous communication is received; and
determine a time to enable the wireless network interface to receive a subsequent synchronous communication based on a time that the network device began receiving the first synchronous communication.

16. The software program of claim 15, wherein the first synchronous communication is a synchronized periodic advertisement comprising a preamble, an access-address, a protocol data unit, and a cyclic redundancy code.

17. The software program of claim 16, wherein the instructions enable the network device to disable the network interface following the access-address.

18. The software program of claim 16, wherein the protocol data unit comprises an extended header, the extended header comprising an Extended Header Flags field, an AdvA field, a TargetA field, a AdvData Info field, an AuxPtr field, a SyncInfo field, a TxPower field and an Additional Controller Advertising Data (ACAD) field, and wherein the instructions enable the network device to disable the wireless network interface following reception of one of the fields.

19. The software program of claim 16, wherein the synchronized periodic advertisement comprises a constant tone extension (CTE) and wherein the instructions enable the network device to disable the wireless network interface before receiving an entirety of the CTE.

20. The software program of claim 19, wherein the instructions enable the network device to disable the wireless network interface before receiving the entirety of the CTE if the network device is not moving.

\* \* \* \* \*